(12) United States Patent
DuBois

(10) Patent No.: US 9,105,110 B2
(45) Date of Patent: Aug. 11, 2015

(54) METHOD OF SIMULATING AN IMAGING EFFECT ON A DIGITAL IMAGE USING A COMPUTING DEVICE

(71) Applicant: FUJIFILM North America Corporation, Valhalla, NY (US)

(72) Inventor: Charles L. DuBois, Rochester, NY (US)

(73) Assignee: FUJIFILM North America Corporation, Valhalla, NY (US)

( * ) Notice: Subject to any disclaimer, the term of this patent is extended or adjusted under 35 U.S.C. 154(b) by 359 days.

(21) Appl. No.: 13/719,991

(22) Filed: Dec. 19, 2012

(65) Prior Publication Data
US 2014/0035953 A1 Feb. 6, 2014

Related U.S. Application Data

(60) Provisional application No. 61/679,690, filed on Aug. 4, 2012.

(51) Int. Cl.
| | |
|---|---|
| *G06T 11/60* | (2006.01) |
| *G06T 3/60* | (2006.01) |
| *G06F 3/01* | (2006.01) |
| *G06F 1/16* | (2006.01) |
| *G06F 3/0484* | (2013.01) |

(52) U.S. Cl.
CPC ............ *G06T 3/60* (2013.01); *G06F 1/1686* (2013.01); *G06F 1/1694* (2013.01); *G06F 3/011* (2013.01); *G06F 3/04845* (2013.01); *G06T 11/60* (2013.01); *G06T 2207/20221* (2013.01)

(58) Field of Classification Search
CPC ...... G02B 3/005; G06T 11/60; G06T 1/0071; G03B 21/625; G06F 3/011
See application file for complete search history.

(56) References Cited

U.S. PATENT DOCUMENTS

| | | | |
|---|---|---|---|
| 7,148,999 B2 | 12/2006 | Xu et al. | |
| 2003/0214662 A1* | 11/2003 | Mochizuki et al. | 358/1.9 |
| 2006/0056022 A1* | 3/2006 | Yeo et al. | 359/460 |
| 2006/0227427 A1* | 10/2006 | Dolgoff | 359/619 |
| 2007/0253593 A1* | 11/2007 | Simske | 382/100 |
| 2010/0098326 A1* | 4/2010 | Abeloe | 382/154 |
| 2011/0025824 A1* | 2/2011 | Kato et al. | 348/46 |
| 2012/0083312 A1* | 4/2012 | Kim | 455/556.1 |
| 2013/0039484 A1* | 2/2013 | Sun et al. | 380/28 |
| 2013/0069933 A1* | 3/2013 | Smithwick et al. | 345/419 |
| 2013/0122939 A1* | 5/2013 | Rodriguez | 455/456.3 |
| 2013/0318479 A1* | 11/2013 | Porwal | 715/849 |

FOREIGN PATENT DOCUMENTS

WO 2005/099248 10/2005

* cited by examiner

*Primary Examiner* — Phi Hoang
(74) *Attorney, Agent, or Firm* — Woods Oviatt Gilman LLP; Dennis B. Danella, Esq.

(57) ABSTRACT

A method of digitally simulating an imaging effect on a base digital image being displayed by a computing device, which is representative of a print or document including the image effect, is provided. In one aspect, the imaging effect is displayed in association with the base digital image as a function of the position of the display of the computing device relative to a first or normalized position of the display. In another aspect, the imaging effect is displayed in association with the base digital image as a function of the position of an object being captured by a camera of the computing device. In both instances, the imaging effect becomes more visible as the display of the device moves further from its first position, or the object captured by the camera moves from its original position.

28 Claims, 7 Drawing Sheets

METHOD OF SIMULATING AN IMAGING EFFECT ON A DIGITAL IMAGE USING A COMPUTING DEVICE

CROSS-REFERENCE TO RELATED APPLICATIONS

This application claims the benefit of U.S. Patent Application No. 61/679,690, filed Aug. 4, 2012, which is hereby incorporated by reference in its entirety.

FIELD OF THE INVENTION

The present invention is directed to a method for simulating an imaging effect on a digital image; in particular, the method is directed to digitally representing a glossmark, watermark, or the like on an image being displayed using a computing device by, for instance, changing the position of the monitor on the computing device or changing the perspective from which a user is viewing the image on the display of the computing device.

BACKGROUND OF THE INVENTION

The use of digital cameras, mobile devices, and tablets to capture and store images is well known. After capturing a digital image, the image can either be viewed as a static two-dimensional (2D) image on the device monitor, or the user may choose to order a traditional 2D print through a photo processing center. Ordering a print may be accomplished by either uploading the digital image to the photo processing center using a networked connection over the Internet, or the digital image may be uploaded to the photo processing center using a kiosk. In either instance, the uploaded digital image will be received by the photo processing center and the print will be created by a fulfillment center that will send the print to a designated recipient.

In addition to offering fulfillment of traditional 2D prints, many photo processing centers are offering prints that include a glossmark or watermark to provide aesthetic interest in a given print, to provide a security feature to prevent unauthorized copying of the print, or to provide other types of information. A glossmark or watermark is one or more words, images, patterns, or symbols that appear in varying contrast on a print when the print is viewed in transmitted light created by a gloss or toner superimposed on certain portions of the print paper, or by thickness or density variations in the paper that is used to produce the print, to highlight the glossmark or watermark. For example, a glossmark may be added to a birthday card print to highlight a message to the recipient of the print, such as "Happy Birthday." Certain watermarks may be incorporated into a print, such as a passport, to prevent the document from being copied by someone that is not authorized to do so.

Certain drawbacks exist when ordering a print of an image that includes a glossmark or watermark. When a traditional 2D print is ordered from a photo processing center, the ordering party is provided the ability to preview what the print will look like before the order is placed. This is particularly helpful if edits are made to the digital image prior to placing the order. When ordering a print of a digital image that includes a glossmark or watermark, there is currently no sufficient method of providing the customer with a realistic preview of how the print will look with the glossmark or watermark. Currently, the only type of preview that is provided during the ordering process is a static digital preview having a plurality of versions of the digital image to be printed, wherein each version shows the glossmark or watermark portion at a different level of contrast. This type of preview is unrealistic and may be difficult for a customer to envision the finished print.

Accordingly, what is needed is a method for providing a realistic simulation of a print including an imaging effect on the display of a computing device. The present invention fills these needs as well as other needs.

SUMMARY OF THE INVENTION

One aspect of the present invention is directed to a method for simulating an image effect on a first digital image, wherein the first digital image is displayed on a display of a computing device. The method comprises: providing the first digital image; providing a second digital image representative of the image effect; overlaying the second digital image with the first digital image; displaying only the first digital image when the display of the computing device is positioned in a first orientation; and displaying the second digital image on top of, or in association with, the first digital image when the display of the computing device is moved to a second orientation. For example, a contrast level of the second digital image increases as the display of the computing device is moved from the first orientation to the second orientation. It should also be understood that the contrast level of the second digital image may further increase as the display of the computing device is moved from the second orientation to a third orientation. Also, the first and second digital images may be edited prior to being associated with one another. It should be understood that the first digital image is displayed when the display of the computing device is moved between the first orientation, the second orientation, and the third orientation.

Another aspect of the present invention is directed to method for simulating an image effect on a first digital image, wherein the first digital image is displayed on a display of a computing device, and the computing device includes a camera for determining the position of an object, such as, for example, a light source or a user of the computing device. The method comprises: providing the first digital image by for example, by capturing the first digital image using the camera on the computing device; providing a second digital image representative of the image effect; associating the second digital image with the first digital image; displaying only the first digital image when the camera determines the object is in a first position relative to the display of the computing device; and displaying the second digital image in association with the first digital image when the camera determines the object is moved to a second position relative to the display of the computing device. For example, a contrast level of the second digital image may increase as the object moves from the first position to the second position. The contrast level of the second digital image may further increase as the object moves from the second position to a third position. The first digital image is displayed when the object moves between the first position, the second position, and the third position. The method may further include the step of editing at least one of the first and second digital images prior to being associated with one another.

The method may also comprise providing a third digital image that is overlaid on the first digital image, wherein displaying only the second digital image in association with the first digital image when the camera determines the object is moved to a second position, for example, left-to-right movement, relative to the display of the computing device, and wherein displaying only the third digital image in association with the first digital image when the camera determines the object is moved to a third position, for example, up-and-down movement, relative to the display of the computing device. The method may further comprise a third digital image that is overlaid on the first digital image, wherein the combination of the first, second, and third digital images is a lenticular print.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawings, wherein.

DETAILED DESCRIPTION OF THE INVENTION

Generally, the tools and methods described herein for digitally simulating an imaging effect on a base digital image may be implemented in hardware, software or a combination thereof. The imaging effect discussed herein may be a glossmark, a watermark, surface texture, or the like that may be overlaid or superimposed on, or otherwise associated with, the base digital image being displayed on a display of a computing device. The base digital image may represent a document or product, such as, but not limited to, a photographic print, tickets, coupons, cards, passports, calendars, and stamps. The imaging effect may be used, for example, as a security feature for protecting sensitive documents from unauthorized duplication, or to provide the viewer with an enhanced experience compared to viewing an ordinary print. The method of the present invention may also be used to simulate lenticular prints.

The present invention is directed to a method for providing a digital simulation of an imaging effect on a base digital image being displayed by a computing device, which is representative of a print or document including the image effect. An imaging effect may be a digital image, distinct from the base digital image, that represents a glossmark, watermark, texture, or the like on a document or product, comprising text, numbers, images, photographs, patterns, or symbols that appear in varying contrast on the base digital print. In one instance, the imaging effect set forth in the method of the present invention is intended to create a realistic digital representation of a glossmark so that the base digital image, when viewed on the display of the computing device, appears to have a gloss or toner superimposed on certain portions of the print paper to provide a varying degree and/or direction of reflectance. In another instance, the imaging effect set forth in the method of the present invention is also capable of creating a realistic digital representation of a watermark so that the base digital image, when viewed on the display of the computing device, appears to have a variation in thickness or density of the paper that is used to produce the print. Differences in surface texture can also be digitally simulated using the method set forth herein.

In a first aspect of the present invention, the imaging effect is displayed in association with the base digital image as a function of the position of the display of the computing device relative to a first or normalized position of the display. The computing device that may be used to perform the method set forth herein may be, for example, a mobile computing device, smartphone, tablet, or any other computing environment that is able to sense the movement of its display relative to a normalized position.

Figure 1:
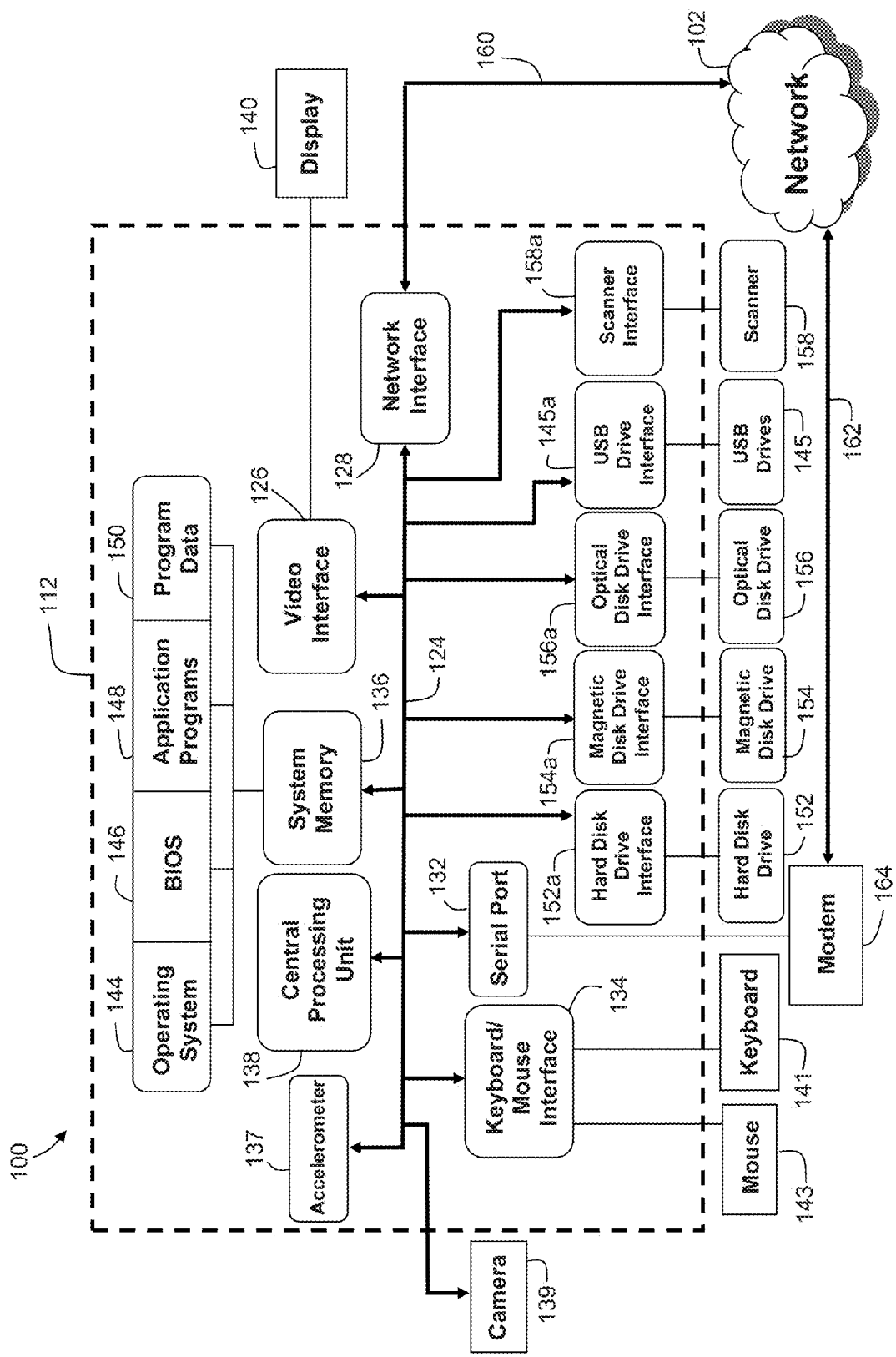
FIG. 1 generally illustrates a block diagram generally illustrating a computing environment in which the invention may be implemented.

FIG. 1 shows an exemplary computing environment 100 that may be used to implement any of the processing described herein. Computing environment 100 may include one or more computers 112 comprising a system bus 124 that couples a video interface 126, network interface 128, a keyboard/mouse interface 134, a system memory 136, and an accelerometer 137 to a Central Processing Unit (CPU) 138. A monitor or display 140 is connected to bus 124 by video interface 126 and provides the user with a graphical user interface to view the digital images. Accelerometer (or g-sensor) 137 operates to sense the position of the display 140 to perform the method in accordance with the invention set forth herein. The graphical user interface allows the user to enter commands and information into computer 112 using a keyboard 141 and a user interface selection device 143, such as a mouse or other pointing device. Keyboard 141 and user interface selection device are connected to bus 124 through keyboard/mouse interface 134. The display 140 and user interface selection device 143 are used in combination to form the graphical user interface which allows the user to implement at least a portion of the present invention, which will be described below. Other peripheral devices may be connected to the remote computer through universal serial bus (USB) drives 145 to transfer information to and from computer 112. For example, a camera 139 and a camcorder may be connected to computer 112 through serial port 132, USB drives 145, or to bus 124 through other equivalent ports so that data representative of a base digital image or image effect, or other digital content may be downloaded to system memory 136 or another memory storage device associated with computer 112 such that the images may be subsequently printed by one or more fulfillment centers. Therefore, the base digital image and image effect may be provided by capturing a digital picture using camera 139, camcorder, or some other image capture device; or retrieved from system memory 136.

The system memory 136 is also connected to bus 124 and may include read only memory (ROM), random access memory (RAM), an operating system 144, a basic input/output system (BIOS) 146, application programs 148 and program data 150. The computer 112 may further include a hard disk drive 152 for reading from and writing to a hard disk, a magnetic disk drive 154 for reading from and writing to a removable magnetic disk (e.g., floppy disk), and an optical disk drive 156 for reading from and writing to a removable optical disk (e.g., CD ROM or other optical media). The computer 112 may also include USB drives 145 and other types of drives for reading from and writing to flash memory devices (e.g., compact flash, memory stick/PRO and DUO, SD card, multimedia card, smart media xD card), and a scanner 158 for scanning items such as still image photographs to be downloaded to computer 112. A hard disk drive interface 152a, magnetic disk drive interface 154a, an optical drive interface 156a, a USB drive interface 145a, and a scanner interface 158a operate to connect bus 124 to hard disk drive 152, magnetic disk drive 154, optical disk drive 156, USB drive 145 and scanner 158, respectively. Each of these drive components and their associated computer-readable media may provide computer 112 with non-volatile storage of computer-readable instruction, program modules, data structures, application programs, an operating system, and other data for computer 112. In addition, it will be understood that computer 112 may also utilize other types of computer-readable media in addition to those types set forth herein, such as digital video disks, random access memory, read only memory, other types of flash memory cards, magnetic cassettes, and the like. Therefore, the base digital image and image effect may also be provided from hard disk drive 152 or other data optical or magnetic storage devices, or accessed through a network from a fulfillment center, as will be described in more detail below.

Figure 2:
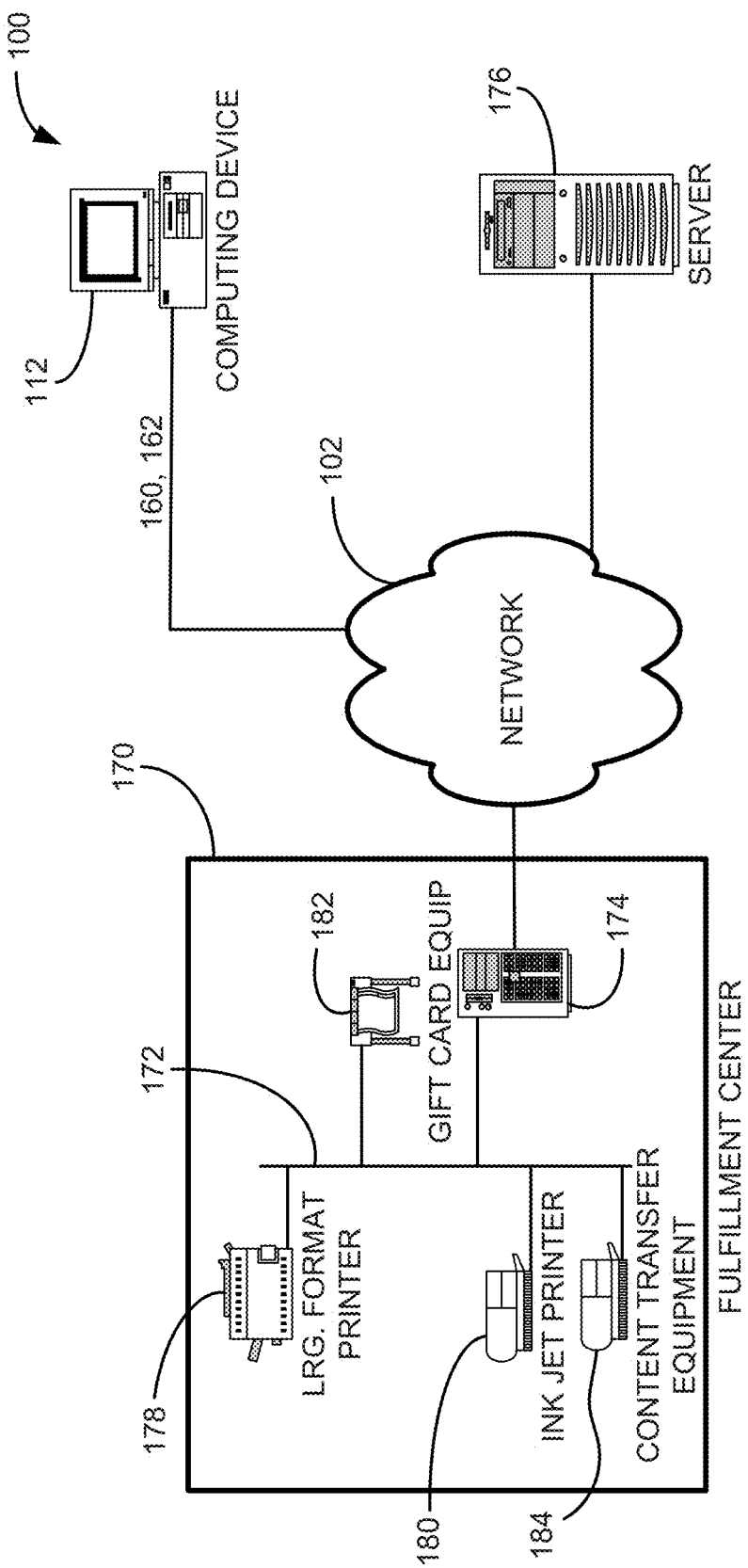
FIG. 2 is a schematic diagram showing a computing device connected to a network environment including a fulfillment center.

As best seen in FIGS. 1 and 2, computer 112 may operate in a networked environment using logical connections with a fulfillment center 170. Network interface 128 provides a communication path 160 between bus 124 and network 102, which allows, for example, an order from a customer to be communicated through network 102 to fulfillment center 170 for a product selection, or to obtain access to base digital images or image effects. Obtaining the base digital images or image effects, for example, may also be communicated from bus 124 through a communication path 162 to network 102 using serial port 132 and a modem 164. Using a modem connection between the computer 112 and a fulfillment center 170 is commonly used in conjunction with a wide area network (WAN). It will be appreciated that the network connections shown herein are merely exemplary, and it is within the scope of the present invention to use other types of network connections between remote computer 112 and fulfillment center 170 including both wired and wireless connections.

As best seen in FIG. 2, fulfillment center 170 may also be remotely located and connected to network 102. The fulfillment center 170 may have its own local area network 172 and a local server 116 for storing base digital images and image effects, in addition to other devices for fulfilling customer print orders. The server 174 may provide local services in addition to providing communication and data exchange with a network server 176. Fulfillment center 170 may include a large photo format printer 178, ink jet printers 180, gift card equipment 182, content transfer equipment 184 or other devices for transferring or incorporating digital images onto a variety of mediums by, for example, printing, etching, embroidering, and embroidering.

Network server 176 may also be connected to network 102 to provide any one or more of a variety of functions including serving as a web server, data store, and application server and/or provide other services that will provide computing device 112 and/or fulfillment center 170 with access to base digital images or image effects, or provide a storage location for base digital images or image effects for future use.

After the base digital image and image effect is obtained, the method further includes the optional step of editing the image effect and/or the base digital image. The editing can be accomplished using a digital image editing application program located on computing device 112, or by accessing through the network 102 a digital image editing application program hosted by fulfillment center 170 or by network server 176. Editing can take the form of cropping, resizing, reorienting, or changing some characteristic of the image itself, such as the contrast, hue, brightness, or the like.

The method further includes the step of associating the image effect with the base digital image. Associating the image effect with the base digital image can take the form of overlaying the image effect and the base digital image. For example, the image effect could be positioned on top of the base digital image. It should be understood that the imaging effect could be edited prior to the next steps of simulating the print product to change the orientation, size, color, or other attribute of the components relative to the base digital image to customize the look and feel of the print product.

Figure 3:
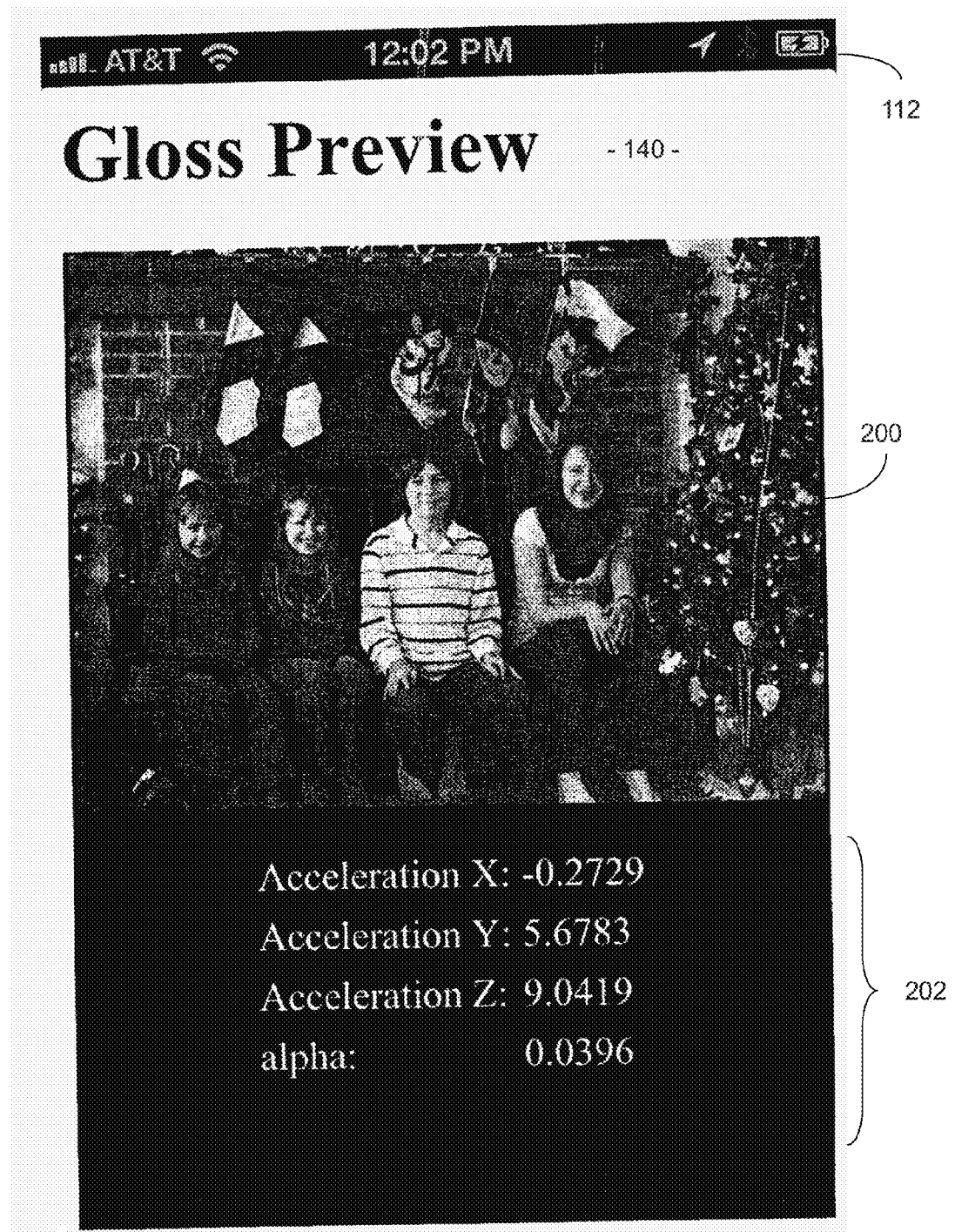
FIG. 3 is a base digital image that may be used in accordance with the present invention and representative accelerometer data.

The method of the present invention further comprises displaying only the base digital image 200 (FIG. 3) when display 140 of computing device 112 is positioned in a first orientation, or normalized position. Computing device 112 may include accelerometer 137 that measures the force of acceleration of the computing device 112, which in turn allows for the angle or relative position of the computing device 112, and thus display 140, to be determined relative to a normalized position. An exemplary set of accelerometer data 202 is shown in FIG. 3. When the alpha number is equal to zero, display 140 is being held in a normalized position and the image effect will not be visible on display 140, and only the base digital image 200 will be viewed on display 140. It should be understood that data 202 is not typically displayed on display 140, but has been shown for purposes of explaining the present invention.

Figure 4:
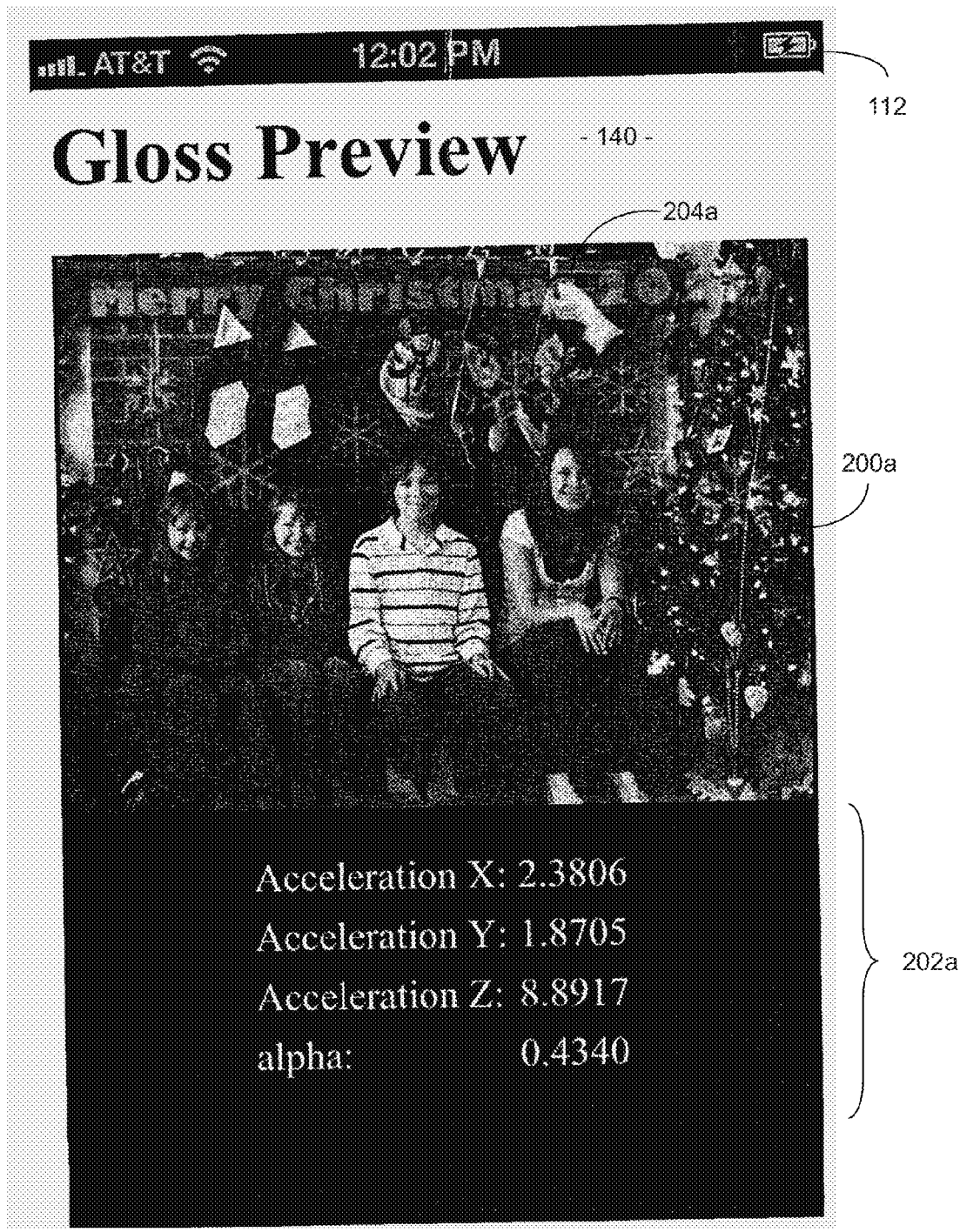
FIG. 4 is an illustration similar to FIG. 3 showing a variation in the accelerometer data and an image effect overlaid on the base digital image.
Figure 5:
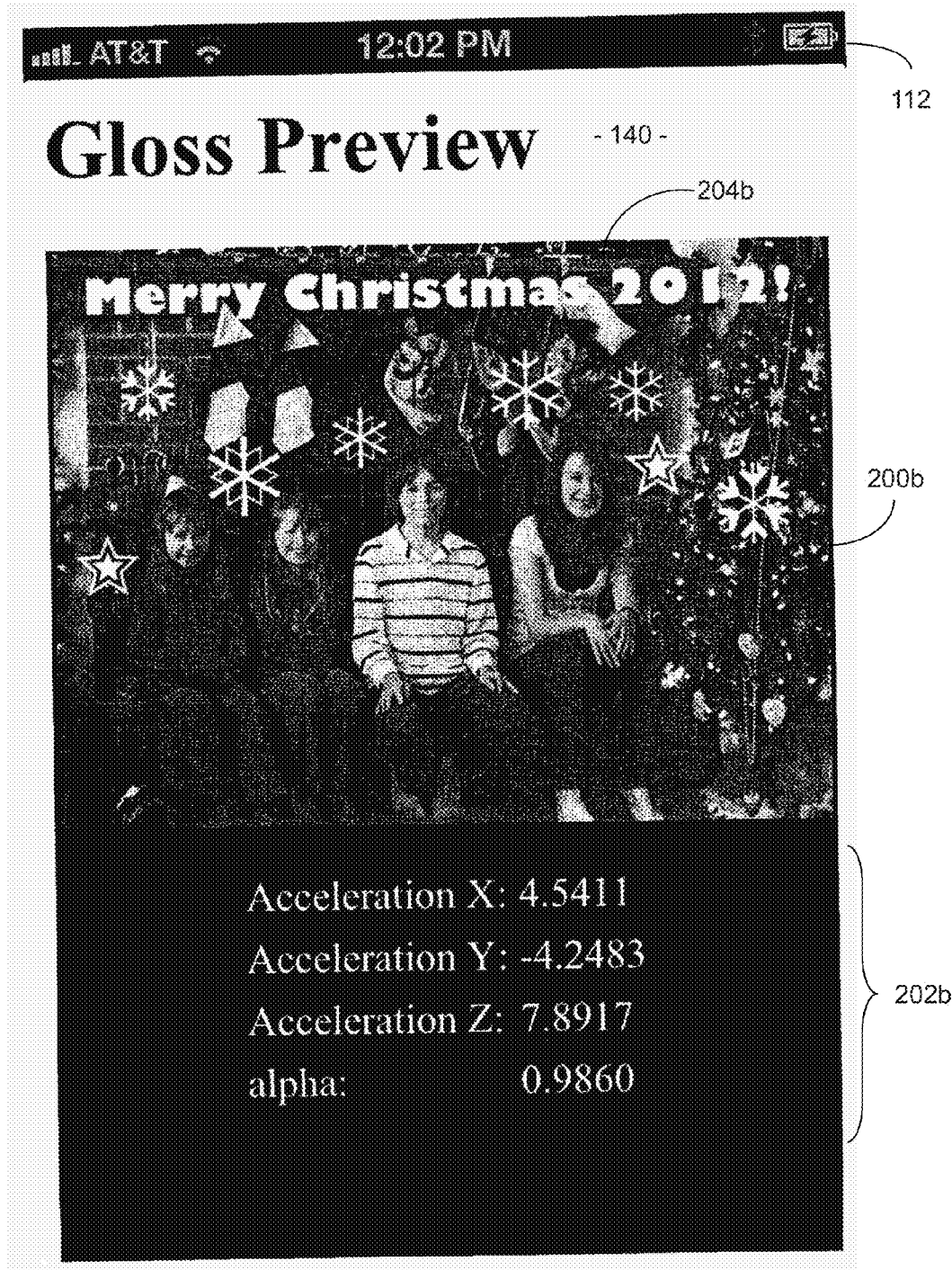
FIG. 5 is an illustration similar to FIG. 4 showing a further variation in the accelerometer data, wherein the image effect is shown in a contrast that is darker than shown in FIG. 4.

As best seen in the sequence of FIGS. 4 and 5, the imaging effect may take the form of a second digital image 204a, 204b that may be overlaid or superimposed on base digital image 200 in a varying degree of contrast depending on the orientation of display 140 relative to the normalized position shown in FIG. 1. As computing device 14 is moved from the normalized position, the accelerometer senses its movement, the alpha number increases, and the contrast of the image effect 204a, 204b increases. In other words, the image effect 204a, 204b gets darker. As best seen in FIG. 4, the alpha number is equal to 0.4340 and second digital image 204a is starting to become visible on display 140. Further, as best seen in FIG. 5, computing device 112 has been moved even further from the position shown in FIG. 4, the alpha number has increased to 0.9860, and the contrast of image effect 204b has increased further. As can be seen by the sequence of FIGS. 3-5, the movement of computing device 112, and thus display 140, from the normalized position results in image effect 204a, 204b being superimposed on top of base digital image 200. Further, it is noted that base digital image 200 may be fully displayed even though the contrast of image effect 204 is changing as the position of the display 140 changes.

In a second aspect of the present invention, a camera may be used to detect the relative position of an object, such as a light source or user of the computing device, and simulate the image effect on the base digital image based on movement of object. It should be understood that many of the functions and operations set forth with respect to the first aspect of the present invention also apply to this aspect of the present invention, and need not be repeated. However, the camera used in this aspect of the invention is configured to operate in conjunction with object or facial recognition software stored either locally or remotely that is capable of recognizing or establishing a "normalized" position of an object, such as the head of a user of the computing device, and determine the magnitude in which the object has moved from the normalized position.

Figure 6A:
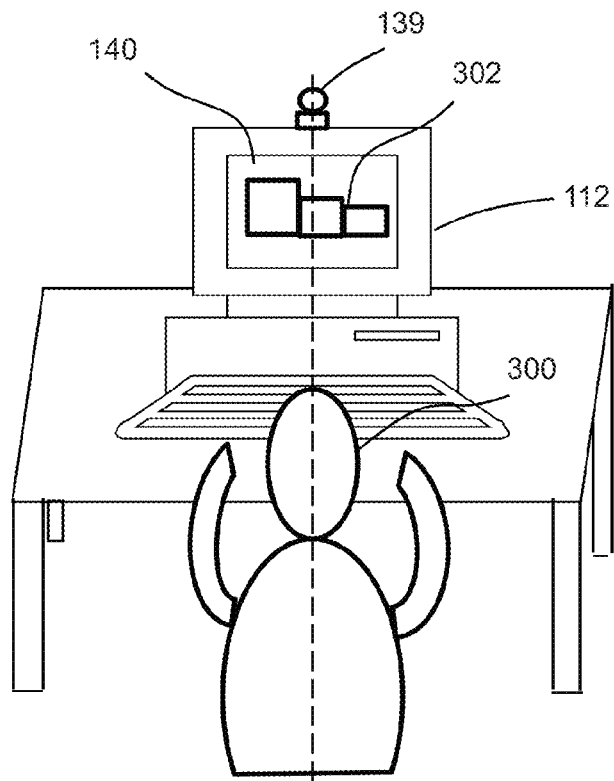
FIG. 6A is a diagram showing a second aspect of the present invention with an object in the normalized position and displaying the base digital image.
Figure 6B:
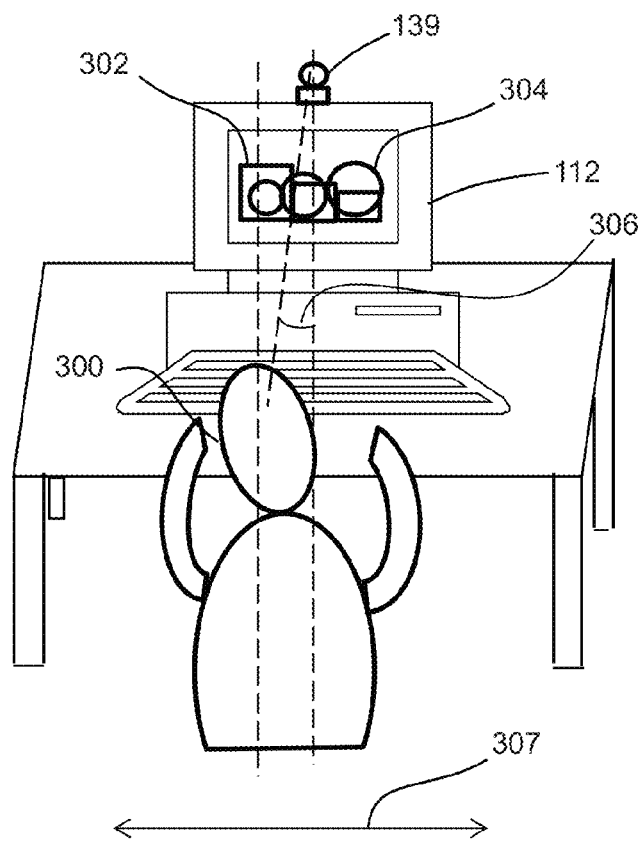
FIG. 6B is a diagram similar to FIG. 6B showing the object in a second position.
Figure 7A:
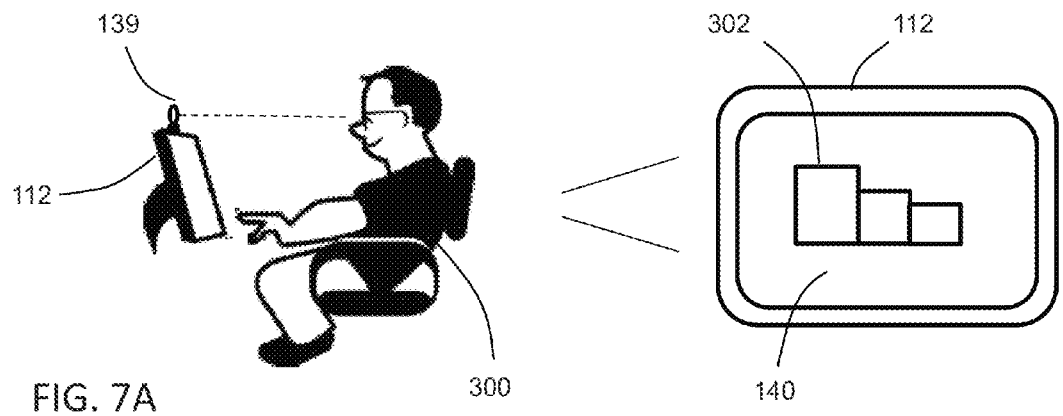
FIG. 7A is a diagram showing another aspect of the present invention showing an object in a normalized position and showing the base digital image.
Figure 7B:
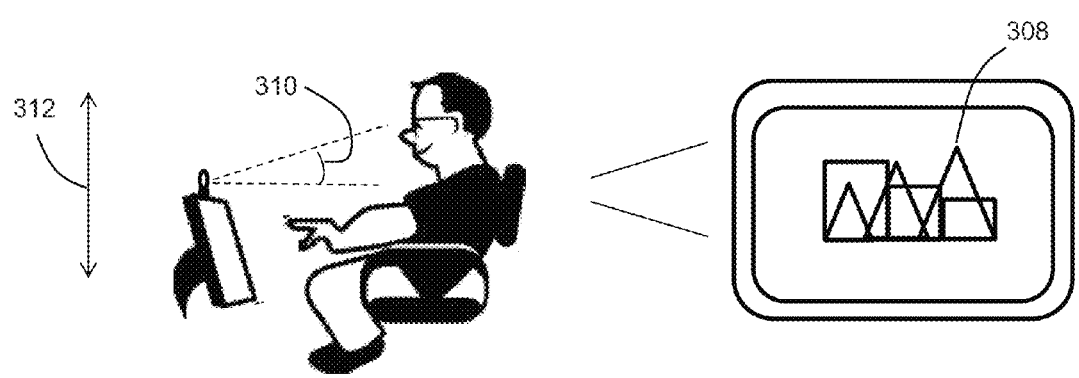
FIG. 7B is a diagram similar to FIG. 7A showing an object in a second position and showing a first image effect overlaid on the base digital image.
Figure 7C:
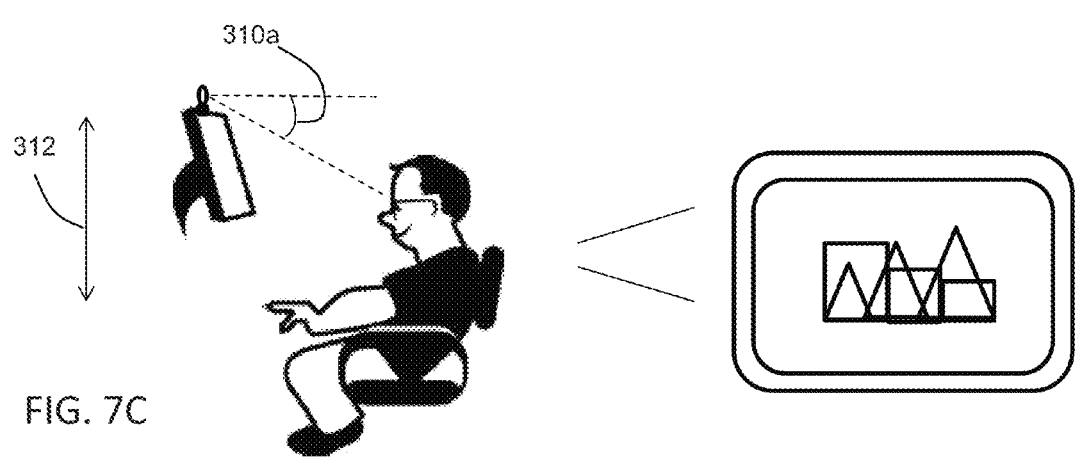
FIG. 7C is a diagram similar to FIG. 7A showing the object in a third position and showing a second image effect overlaid on the base digital image.

As best seen in FIG. 6A, when an object 300 is viewing display 140 of computing device 112 in a normalized position (e.g., a first viewing angle), an image effect would not be displayed on base digital image 302. As a camera 139 on computing device 112 determines that the object 300 has changed position from the normalized position to a second position, as best seen in FIG. 6B, then the contrast of image effect 304 will increase as the object moves further from the normalized position to a second viewing angle 306.

In a further aspect of the present invention that relates to the use of the camera to determine the position of an object relative to a normalized position for purposes of changing the contrast of the image effect on the base digital image, it is further contemplated that the camera change the image effect that is overlaid on the base digital image based on the direction of movement of the object. As indicated above with respect to FIGS. 6A and 6B, the contrast of image effect 304 increases as viewing angle 306 of object 300 increases in a side-to-side direction 307. In addition, the present invention also includes providing a second image effect 308 that is overlaid on top of base digital image 302, which increases in contrast when camera 139 determines that object 300 has moved in a vertical direction 312, or a direction other than direction 307, to establish a viewing angle 310, 310a that varies from a normalized position. In other words, the contrast of second image effect 308 will increase or otherwise change as viewing angle 310, 310a increases.

In yet another aspect of the present invention, the contrast of image effect may change based on a user interacting with the computing device 112, such as by finger swiping the display 140, or using the keyboard 141 or mouse 143 to move the viewing angle of the base digital image. This method may be implemented without having to rely on an accelerometer or a camera that senses the movement of the users viewing angle of the display.

The method of the present invention provides a method of simulating imaging effects on a base digital image without the need to print or produce an actual physical product having such a feature. It should also be understood that the aspects of the present invention may also be implemented in digitally displaying lenticular prints. In addition, it should also be understood that any of the above-referenced method can be stored on a non-transitory computer-readable medium and implemented using computer-executable instructions.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirements.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A method for simulating a two-dimensional (2D) print of an image effect on a first digital image, the first digital image and the image effect configured for being simultaneously displayed through a display of a computing device, the method comprising:
   providing the first digital image through the display of the computing device;
   providing a second digital image through the display of the computing device, wherein the second digital image is representative of the image effect, and wherein the second digital image is configured for having a varying attribute;
   associating the second digital image with the first digital image such that the association is representative of the 2D print of the image effect on the first digital image;
   displaying only the first digital image when the display of the computing device is positioned in a first orientation; and
   displaying the association of the second digital image with the first digital image when the display of the computing device is moved to a second orientation, wherein the second digital image is displayed by changing the attribute.

2. A method in accordance with claim 1, wherein the step of associating the second digital image with the first digital image includes overlaying the second digital image and the first digital image.

3. A method in accordance with claim 2, wherein the step of displaying the second digital image in association with the first digital image includes displaying the second digital image on top of the first digital image.

4. A method in accordance with claim 1, wherein the first digital image is edited prior to being associated with the second digital image.

5. A method in accordance with claim 1, wherein the second digital image is edited prior to being associated with the first digital image.

6. A method in accordance with claim 1, wherein the image effect is at least one of a glossmark or a watermark.

7. A method in accordance with claim 1, wherein the image effect is at least one of text, numbers, images, photographs, patterns, or symbols.

8. A method in accordance with claim 1, wherein the computing device is one of a desktop computer, a mobile computing device, or a tablet.

9. A method in accordance with claim 1, wherein the first digital image is provided by capturing the first digital image using a camera on the computing device.

10. A method in accordance with claim 1, wherein said attribute includes a contrast level, and wherein said contrast level increases as the display of the computing device is moved from the first orientation to the second orientation.

11. A method in accordance with claim 10, wherein the contrast level of the second digital image increases as the display of the computing device is moved from the second orientation to a third orientation.

12. A method in accordance with claim 11, wherein the first digital image is displayed when the display of the computing device is moved between the first orientation, the second orientation, and the third orientation.

13. A non-transitory computer-readable medium having computer-executable instructions for simulating a two-dimensional (2D) print of an image effect on a first digital image, the first digital image and the image effect configured for being simultaneously displayed through a display of a computing device, the method comprising:
providing the first digital image through the display of the computing device;
providing a second digital image through the display of the computing device, wherein the second digital image is representative of the image effect, and wherein the second digital image is configured for having a varying attribute;
associating the second digital image with the first digital image such that the association is representative of the 2D print of the image effect on the first digital image;
displaying only the first digital image when the display of the computing device is positioned in a first orientation; and
displaying the association of the second digital image with the first digital image when the display of the computing device is moved to a second orientation, wherein the second digital image is displayed by changing the attribute.

14. A non-transitory computer-readable medium in accordance with claim 13, wherein said attribute includes a contrast level, and wherein said contrast level increases as the display of the computing device is moved from the first orientation to the second orientation.

15. A method for simulating a two-dimensional (2D) print of an image effect on a first digital image, the first digital image and the image effect configured for being simultaneously displayed through a display of a computing device, the computing device including a camera for determining the position of an object, the method comprising:
providing the first digital image through the display of the computing device;
providing a second digital image through the display of the computing device, wherein the second digital image is representative of the image effect, and wherein the second digital image is configured for having a varying attribute;
associating the second digital image with the first digital image such that the association is representative of the 2D print of the image effect on the first digital image;
displaying only the first digital image when the camera determines the object is in a first position relative to the display of the computing device; and
displaying the association of the second digital image with the first digital image when the camera determines the object is moved to a second position relative to the display of the computing device, wherein the second digital image is displayed by changing the attribute.

16. A method in accordance with claim 15, wherein the object is at least one of a light source or a user.

17. A method in accordance with claim 15, wherein the step of associating the second digital image with the first digital image includes overlaying the second digital image and the first digital image.

18. A method in accordance with claim 17, wherein the step of displaying the second digital image in association with the first digital image includes displaying the second digital image on top of the first digital image.

19. A method in accordance with claim 15, wherein the first digital image is edited prior to being associated with the second digital image.

20. A method in accordance with claim 15, wherein the second digital image is edited prior to being associated with the first digital image.

21. A method in accordance with claim 15, wherein the image effect is at least one of a glossmark or a watermark.

22. A method in accordance with claim 15, wherein the computing device is one of a desktop computer, a mobile computing device, or a tablet.

23. A method in accordance with claim 15, wherein the first digital image is provided by capturing the first digital image using the camera on the computing device.

24. A method in accordance with claim 15, wherein said attribute includes a contrast level, and wherein said contrast level increases as the display of the computing device is moved from the first orientation to the second orientation.

25. A method in accordance with claim 24, wherein the contrast level of the second digital image increases as the object moves from the second position to a third position.

26. A method in accordance with claim 25, wherein the first digital image is displayed when the object moves between the first position, the second position, and the third position.

27. A method in accordance with claim 15, further comprising a third digital image that is overlaid on the first digital image, wherein displaying only the second digital image in association with the first digital image when the camera determines the object is moved to a second position relative to the display of the computing device, and wherein displaying only the third digital image in association with the first digital image when the camera determines the object is moved to a third position relative to the display of the computing device.

28. A method in accordance with claim 15, further comprising a third digital image that is overlaid on the first digital image, wherein the combination of the first, second, and third digital images is a lenticular print.

* * * * *